Patented Sept. 22, 1925.

1,554,358

UNITED STATES PATENT OFFICE.

DIN CHRISTOPHER LOHMANN, OF WEST MILTON, OHIO.

NONCONDUCTING COMPOSITION BOARD.

No Drawing. Application filed March 5, 1923. Serial No. 623,025.

*To all whom it may concern:*

Be it known that I, DIN CHRISTOPHER LOHMANN, a citizen of the United States, residing at West Milton, in the county of Miami and State of Ohio, have invented a new and useful Nonconducting Composition Board, of which the following is a specification.

The object of my invention is the production of a non-conducting composition board to be used in buildings as a lining for preventing radation of heat and rendering them more fire-proof.

My composition consists of a mixture of paper-pulp or other vegetable fibrous material, a plastic mineral material such as clay and a vegetable cementing material such as wheat flour or other vegetable cementing material.

In preparing the composition I prefer to use the ingredients in about the following proportions—viz, fifty-five pounds of paper-pulp fifty-five pounds of clay, and five pounds of wheat flour.

Good results may be obtained, however, when the ingredients are varied within the following limits: vegetable fibrous material, fifty to sixty pounds; plastic mineral material twenty-five to seventy-five pounds; vegetable cementing material two to twelve pounds.

The wheat flour is mixed with about ten gallons of water, which is then heated to the boiling point. This solution is added to the other ingredients. Sufficient water is added to form a paste or mortar of such consistency, as to enable it to be molded in forms most convenient for practical use, such as board or blocks. These are dried and when dry are ready for use.

My composition is light, is spark proof and fire resisting, is a very efficient non-conductor of heat and as a whole possesses in a high degree all the desired properties of a lining for buildings.

I claim:

1. A composition board adapted to form a lining for buildings and the like comprising fifty to sixty pounds of paper-pulp twenty-five to seventy-five pounds of clay, and two to twelve pounds of wheat flour.

2. A composition board consisting of fifty-five pounds of paper-pulp fifty-five pounds of clay and five pounds of wheat flour.

DIN CHRISTOPHER LOHMANN.